US012564848B2

(12) United States Patent
Sesser

(10) Patent No.: US 12,564,848 B2
(45) Date of Patent: Mar. 3, 2026

(54) IRRIGATION SPRINKLER WITH MULTIPLE PATTERNS AND ROTATION SPEEDS

(71) Applicant: NELSON IRRIGATION CORPORATION, Walla Walla, WA (US)

(72) Inventor: George L. Sesser, Edmonds, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 706 days.

(21) Appl. No.: 17/943,545

(22) Filed: Sep. 13, 2022

(65) Prior Publication Data

US 2023/0084314 A1 Mar. 16, 2023

Related U.S. Application Data

(60) Provisional application No. 63/244,929, filed on Sep. 16, 2021.

(51) Int. Cl.
*B05B 3/04* (2006.01)
*B05B 3/00* (2006.01)

(52) U.S. Cl.
CPC ............ *B05B 3/0426* (2025.08); *B05B 3/003* (2013.01)

(58) Field of Classification Search
CPC ..... B05B 3/0486; B05B 3/003; B05B 3/0426; B05B 3/0425; B05B 3/005; B05B 3/06; B05B 12/16
See application file for complete search history.

(56) References Cited

U.S. PATENT DOCUMENTS

| | | | | |
|---|---|---|---|---|
| 3,669,353 | A | 6/1972 | Hanson et al. | |
| 3,680,778 | A | 8/1972 | Sisson et al. | |
| 7,584,904 | B2 | 9/2009 | Townsend | |
| 7,789,323 | B2 | 9/2010 | Nelson et al. | |
| 7,980,488 | B2 | 7/2011 | Townsend | |
| 8,567,691 | B2 | 10/2013 | Townsend | |
| 9,802,167 | B2 | 10/2017 | Stroh et al. | |
| 10,239,066 | B2 | 3/2019 | Sesser et al. | |
| 2008/0277498 | A1* | 11/2008 | Townsend | B05B 3/005 239/222.17 |

(Continued)

FOREIGN PATENT DOCUMENTS

WO WO 2016/132365 8/2016

OTHER PUBLICATIONS

International Search Report dated Dec. 22, 2022 issued in PCT International Patent Application No. PCT/US2022/043304, 5 pp.

*Primary Examiner* — Steven M Cernoch
(74) *Attorney, Agent, or Firm* — NIXON & VANDERHYE P.C.

(57) ABSTRACT

A sprinkler module is cooperable with a sprinkler nozzle unit supporting a sprinkler nozzle to define a sprinkler configuration. The sprinkler module includes a cage attachable to the sprinkler nozzle unit and including a pair of struts, a cap connected to the cage via the pair of struts, and a deflector plate cooperable with the sprinkler nozzle and rotatably secured between the cap and the cage. The deflector plate includes a hub extending through the cap. A plate gear with gear teeth is secured to the hub and is rotatable with the deflector plate, and a cover assembly is connected to the cap. The cover assembly includes a brake gear coupled with a brake assembly, where the brake gear is disposed in a path of the gear teeth.

19 Claims, 14 Drawing Sheets

(56) References Cited

U.S. PATENT DOCUMENTS

| | | | | |
|---|---|---|---|---|
| 2011/0031332 | A1 | 2/2011 | Sesser et al. | |
| 2011/0114755 | A1 | 5/2011 | Katzman et al. | |
| 2015/0224520 | A1 | 8/2015 | Kim et al. | |
| 2018/0264488 | A1* | 9/2018 | Mareli | B05B 3/006 |

* cited by examiner

IRRIGATION SPRINKLER WITH MULTIPLE PATTERNS AND ROTATION SPEEDS

CROSS-REFERENCES TO RELATED APPLICATIONS

This application claims the benefit of U.S. Provisional Patent Application No. 63/244,929, filed Sep. 16, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to an up-top rotator-type pivot sprinkler and, more particularly, to a rotator-type sprinkler including a module attachable to an existing design that is functional over a wide range of nozzle sizes and has a significantly larger throw radius.

Rotator-type sprinklers typically have a stream deflector plate that captures the nozzle stream after it emits to atmosphere and deflects the stream such that it drives the concentric rotation of the plate and properly distributes the water. A brake assembly is typically associated with the plate to slow rotation of the plate.

A larger throw radius widens the wetted band of the pivot, which lowers the application rate of the water and thereby gives the water a better chance of being absorbed into the soil, rather than running off. The wider wetted band also may reduce problems of pivot tires sinking into saturated soil and creating deep ruts.

Existing up-top rotator designs use a multi-stream deflector plate with the deflector plate mounted directly on the brake shaft. These products are relatively low cost, due to simple, noncompensating, brake design (radial loads are balanced, so low cost bearings are usable), and these products work over a wide range of nozzle sizes due to compensation via the design of the plate grooves (nozzle size compensation is relatively easy to accomplish with this style of plate, however, pressure compensation remains a significant challenge).

Dividing the water into multiple streams, however, has the drawback of reducing the throw radius as compared to a concentrated single stream. Existing rotator products produce a larger throw radius using a single stream plate that is supported at the entrance end with an unsealed plain bearing, but the upper end of the plate is mounted directly to the brake assembly (low cost, noncompensating brake); so consequentially, there is very little rotation speed compensation, and so these work with a very limited range of nozzles for each plate. There also exist compensating brake assemblies for pivot products, but in these designs, the plate is totally supported by the brake assembly shaft, and all of the compensation is in the sealed brake assembly, which turns out to be significantly more expensive to manufacture.

SUMMARY

The design of the described embodiments uses a unique combination of support bearings and water passage geometry for the deflector plate in combination with shielding geometry, gears and low cost brake assemblies. In some embodiments, a bow tie version has two beefy fixed struts that the stream zips quickly past, so there is little mist generated by the stream impinging on the struts. Other embodiments use different fixed strut arrangements, or could even use struts that rotate with the deflector plate. A center pivot equipped with bow tie units on top that have the struts aligned with the span pipe would create, at any instant in time, a wetted band in front of the pivot, a dry band under the pivot structure and tires, and a wetted band behind the pivot. This gives the soil a time to be wetted, followed by a time of absorbing without further wetting, followed by another time to be wetted, followed by another time of absorbing, as opposed to normal pivot watering where the soil is intensely watered and often generates significant runoff.

In an exemplary embodiment, a sprinkler module cooperable with a sprinkler nozzle unit supporting a sprinkler nozzle includes a cage attachable to the sprinkler nozzle unit and including a pair of struts, a cap connected to the cage via the pair of struts, and a deflector plate cooperable with the sprinkler nozzle and rotatably secured between the cap and the cage. The deflector plate includes a hub extending through the cap. A plate gear secured to the hub is rotatable with the deflector plate and includes gear teeth. A cover assembly connected to the cap includes a brake gear coupled with a brake assembly, where the brake gear is disposed in a path of the gear teeth.

The cage may include snap-fit tabs engageable with the sprinkler nozzle unit. The deflector plate may include an upstanding ring, and the cap may include a first labyrinth shield that mates with the upstanding ring of the deflector plate. In this context, the deflector plate may include a radial bearing disposed radially inward of the upstanding ring, and the cap may include a second labyrinth shield that mates with the radial bearing of the deflector plate. The radial bearing may define a grease cup.

The gear teeth may be positioned about only a portion of the plate gear.

The cover assembly may include two brake gears respectively coupled with two brake assemblies. The two brake assemblies may include different braking characteristics.

The gear teeth may be configured such that the deflector plate will rotate more rapidly past the struts than between the struts. The gear teeth may be configured in a bow tie pattern.

The cover assembly may include two brake gears respectively coupled with two brake assemblies, and the gear teeth may be configured to effect a bow tie wetted pattern, where the two brake assemblies may include different braking characteristics such that opposite sides of the bow tie wetted pattern are watered at different speeds.

In some embodiments, the cover assembly may be made of a friction material, and a ring of the cover assembly may mate with the plate gear.

In another exemplary embodiment, a center pivot includes the sprinkler module of the described embodiments secured on a pivot pipe, where the struts and the cap are installed in alignment with the pivot pipe.

In another exemplary embodiment, a sprinkler includes a sprinkler body securable to a source of fluid under pressure, a nozzle positioned in the sprinkler body, a cage attached to the sprinkler body and including a pair of struts, a cap connected to the cage via the pair of struts, and a deflector plate cooperable with the nozzle and rotatably secured between the cap and the cage. The deflector plate includes a hub extending through the cap. A plate gear is secured to the hub and is rotatable with the deflector plate, where the plate gear includes gear teeth. A cover assembly connected to the cap includes a brake gear coupled with a brake assembly. The brake gear is disposed in a path of the gear teeth.

In yet another exemplary embodiment, a sprinkler module includes a deflector plate that is rotatable via water flow, where the deflector plate includes a hub, a plate gear secured to the hub and rotatable with the deflector plate, where the plate gear includes gear teeth, and a brake gear coupled with a brake assembly and selectively engaging the gear teeth.

In still another exemplary embodiment, a sprinkler head includes a sprinkler body connected to a source of pressurized water, having a longitudinal center axis and provided with a nozzle that emits a stream along the longitudinal center axis. A water distribution plate supported downstream of the nozzle is configured to deflect the stream such that it drives concentric rotation of the water distribution plate about the longitudinal center axis and distributes the pressurized water radially outward in one or more streams. An arrangement of two or more gears and one or more brake assemblies is associated with the sprinkler body and water distribution plate to vary a speed of rotation of the water distribution plate in different sectors of its rotation.

BRIEF DESCRIPTION OF THE DRAWINGS

These and other aspects and advantages will be described in detail with reference to the accompanying drawings, in which.

DETAILED DESCRIPTION

Figure 1:
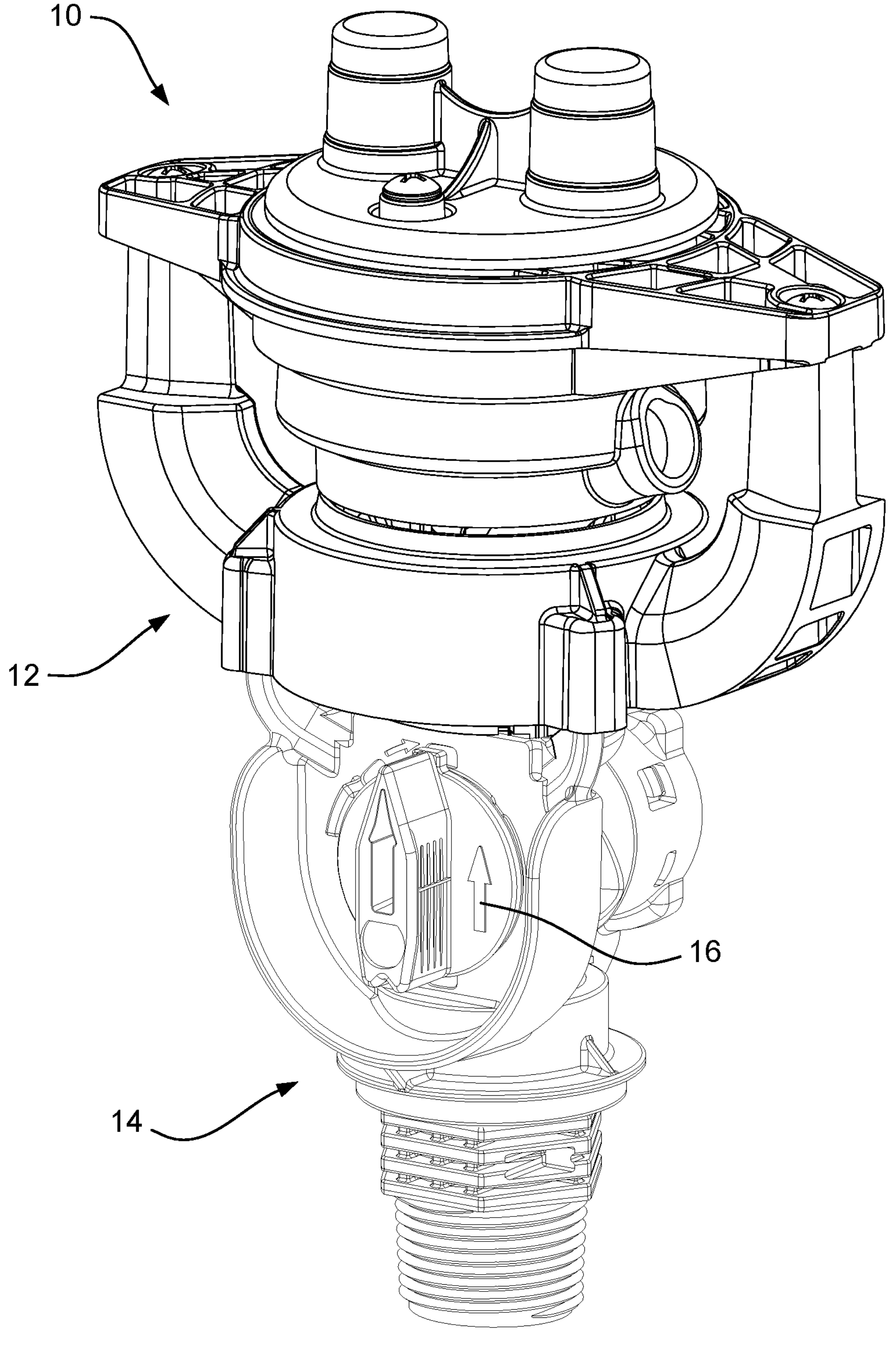
FIG. 1 is a perspective view of an assembled sprinkler.
Figure 2:
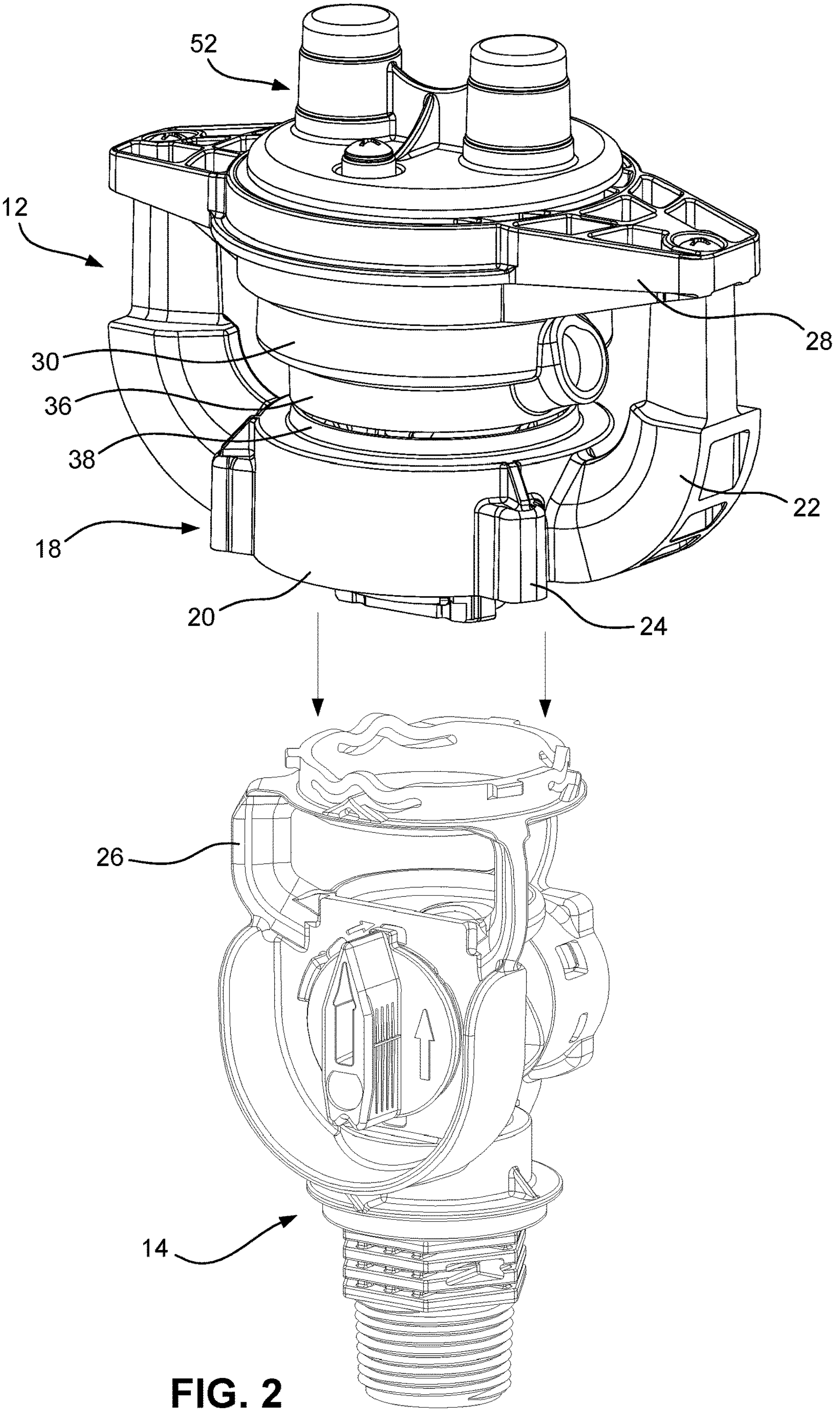
FIG. 2 shows the sprinkler module separated from the sprinkler nozzle unit.

FIG. 1 shows an irrigation sprinkler 10 including a sprinkler module 12 coupled with a sprinkler nozzle unit 14 supporting a sprinkler nozzle 16. FIG. 2 shows the module 12 separated from the sprinkler nozzle unit 14. In FIGS. 1 and 2, the sprinkler nozzle unit 14 is the sprinkler body from the R3030 sprinkler available from Nelson Irrigation Corporation of Walla Walla, Washington. The sprinkler body shown in the images is exemplary, and other sprinkler bodies may be suitable for use with the sprinkler module 12. The invention is not meant to be limited to the R3030 sprinkler body as shown or limited to a module type construction.

The module 12 includes a cage 18 with a connecting section 20 and a pair of struts 22. In some embodiments, the connecting section 20 includes a plurality of hollow bosses 24 that fit loosely over sub-struts 26 of the sprinkler nozzle unit 14, and snap-fit tabs 27 (FIG. 6) snap under the connecting ring at the top of the sub-struts 26. Other possible versions could use different fixed strut arrangements or could use struts that rotate with the deflector plate.

Figure 3:
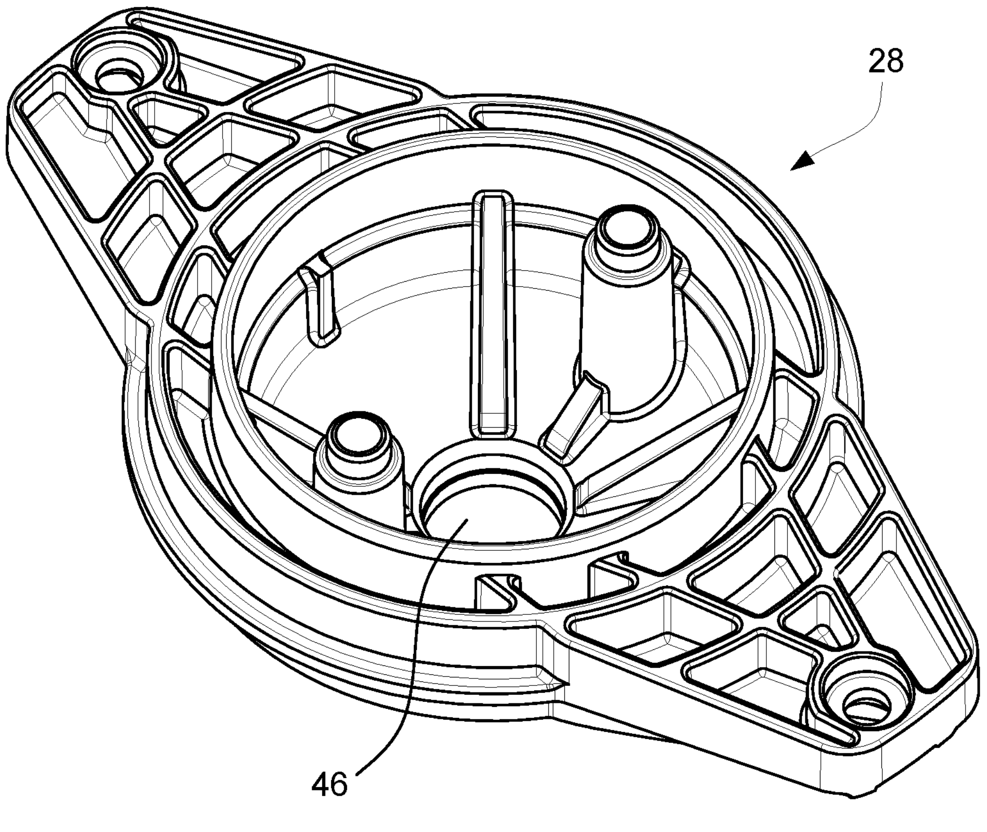
FIG. 3 is a perspective view of the cap.
Figure 4:
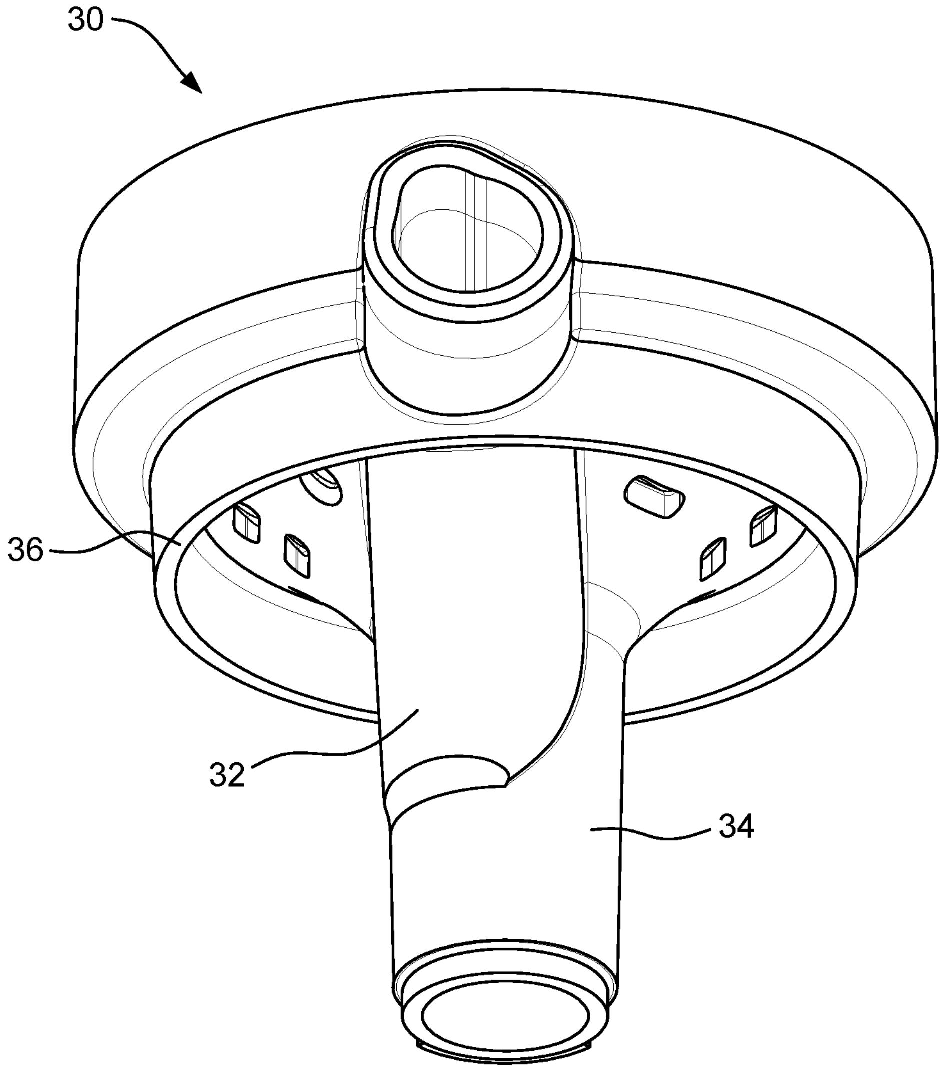
FIG. 4 is a perspective view of the deflector plate.
Figure 5:
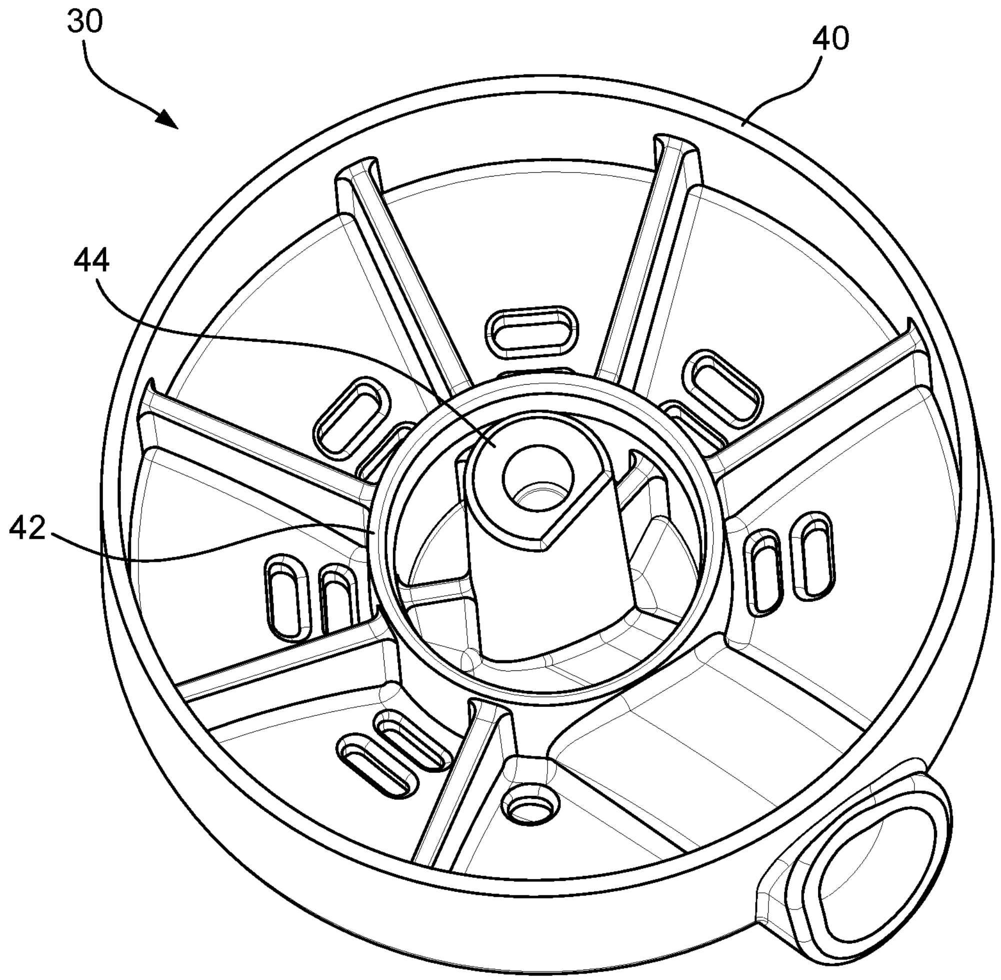
FIG. 5 shows an upper portion of the deflector plate.

A cap 28 is connected to the cage 18 via the pair of struts 22. A detailed view of a top side of the cap 28 is shown in FIG. 3. A deflector plate 30 is cooperable with the sprinkler nozzle 16 and is rotatably secured between the cap 28 and the cage 18. With reference to FIGS. 4 and 5, the deflector plate 30 includes a deflector passage 32 that receives water from the nozzle 16. In some embodiments, the deflector passage 32 is a fully enclosed water passage, but an open channel would work as well. The deflector passage 32 is offset so that water impacting the passage 32 will cause the deflector plate 30 to rotate. The deflector plate 30 also includes a shaft channel 34 and a bearing ring 36. The bearing ring 36 is selectively engageable with an upstanding ring 38 in the cage (see FIG. 6).

Figure 6:
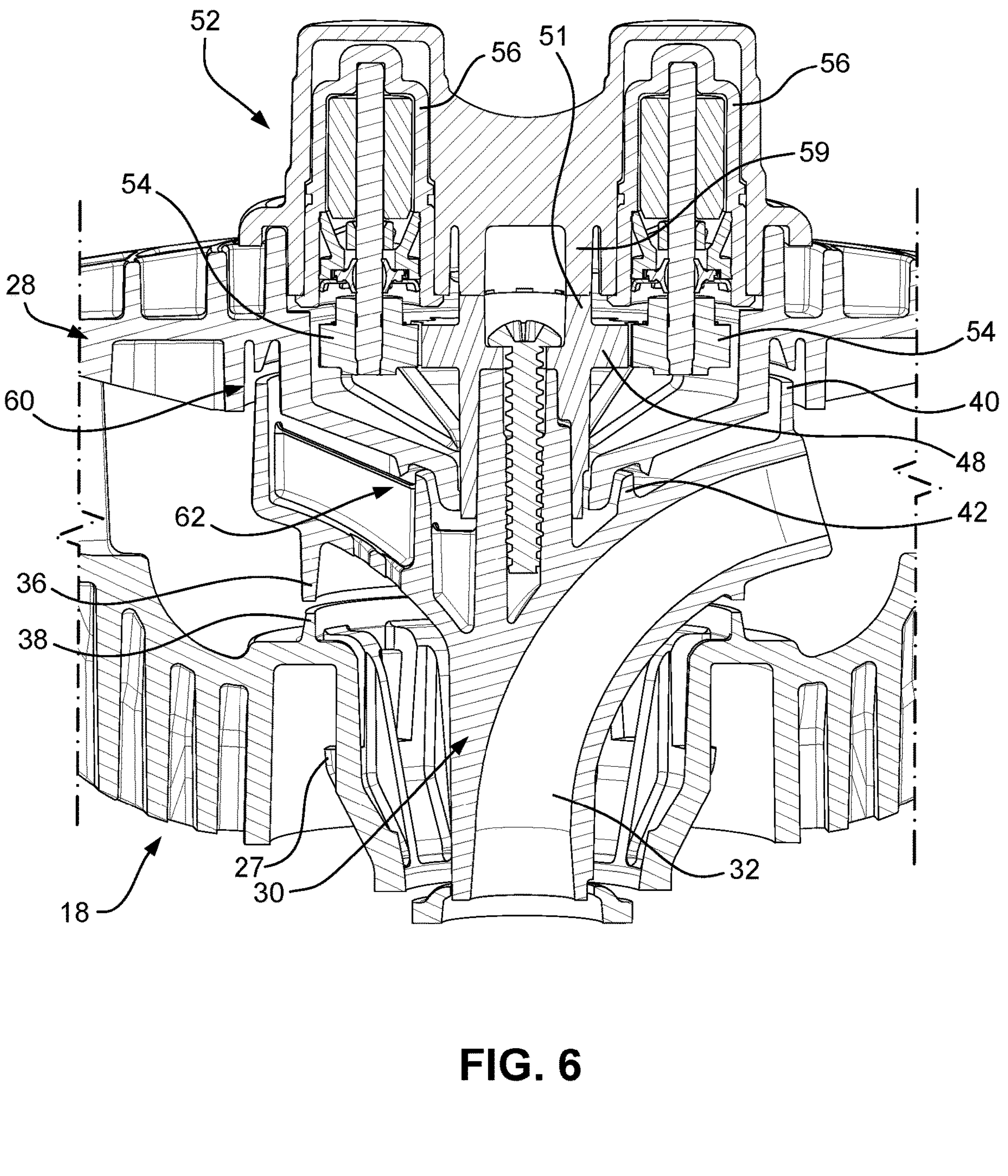
FIG. 6 is a cross-sectional view through the sprinkler module.
Figure 7:
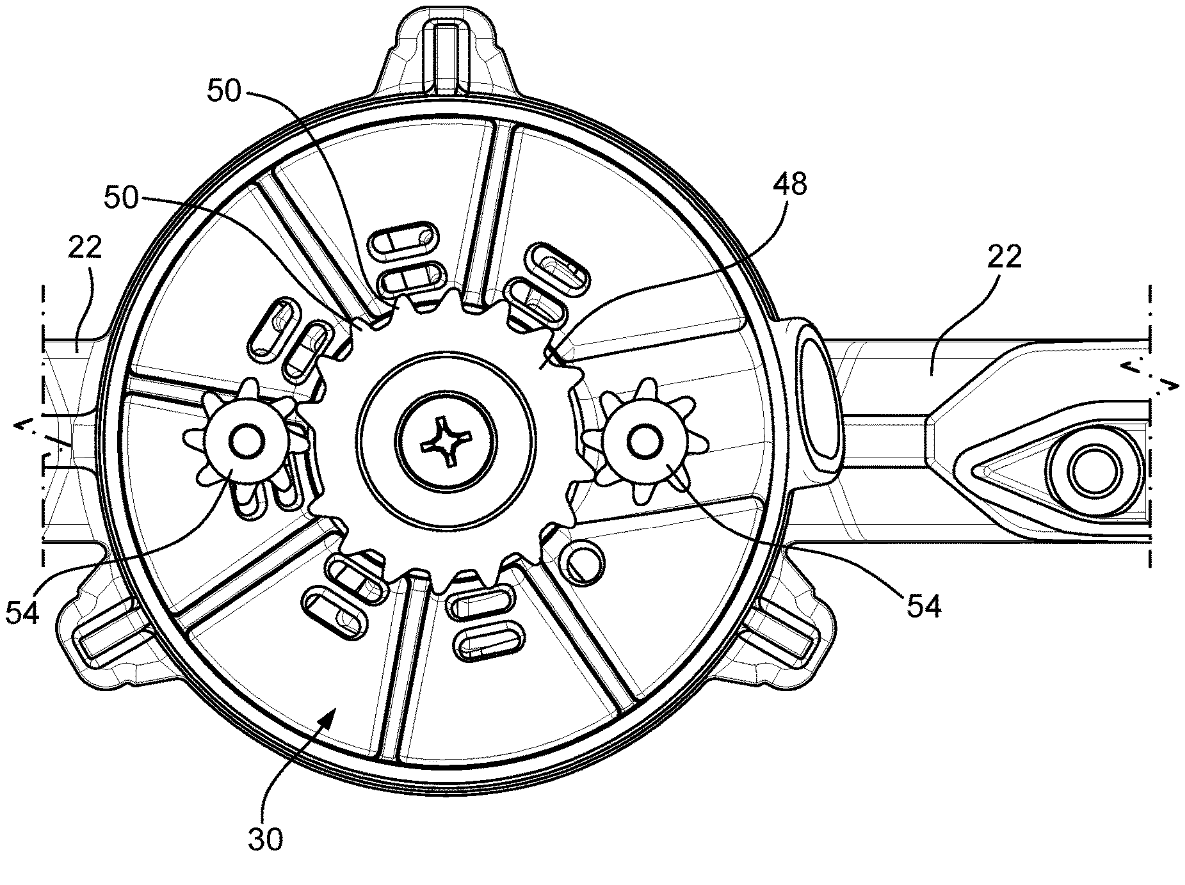
FIGS. 7 and 8 show an exemplary gear arrangement in the cap cover assembly for creating a bow tie wetting pattern.
Figure 8:
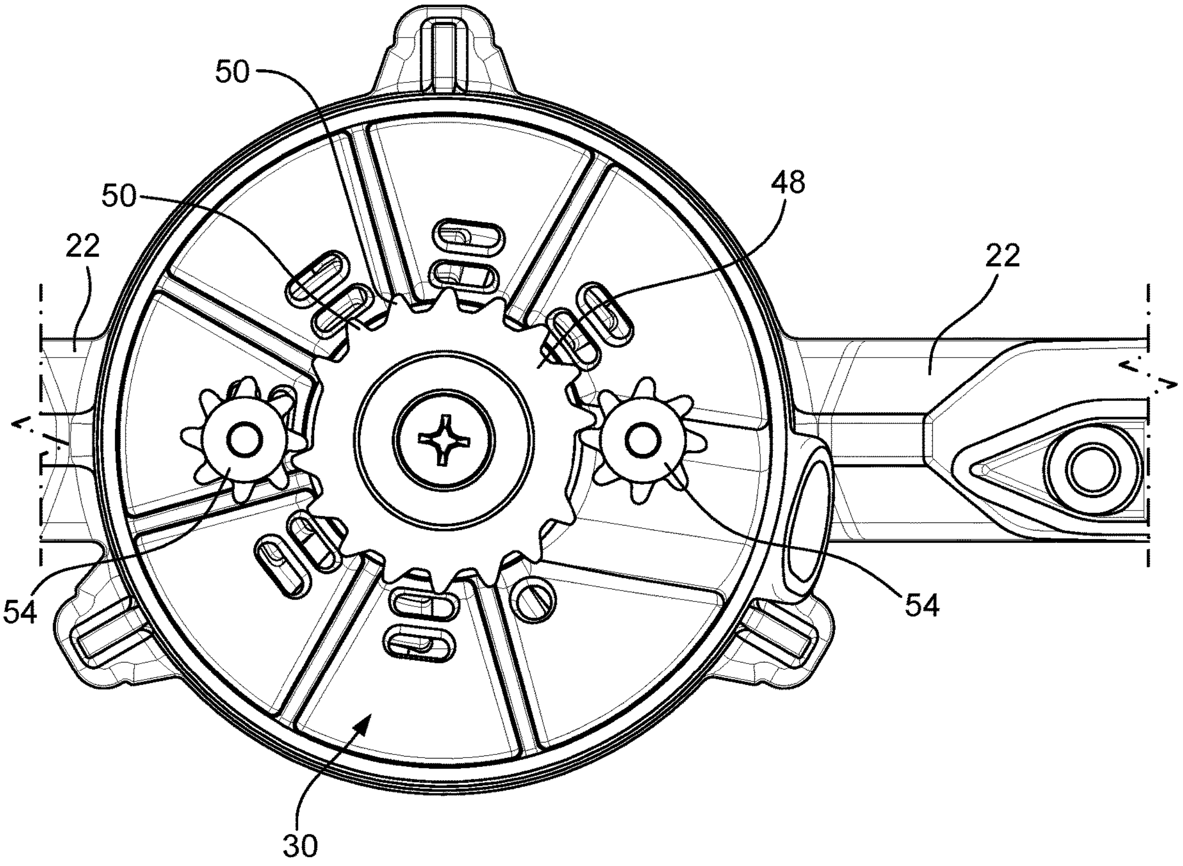
Figure 9:
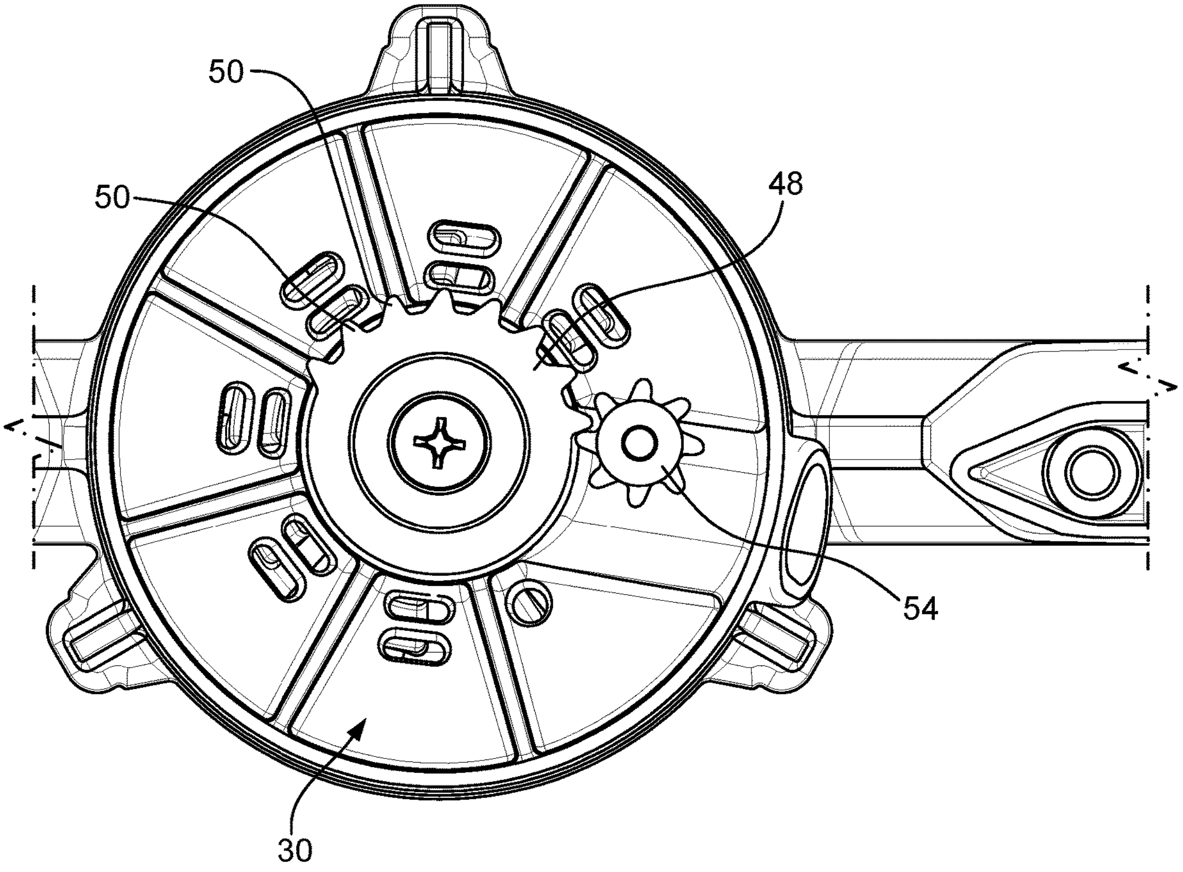
FIG. 9 shows an exemplary gear assembly with an alternative wetted pattern.

With reference to FIGS. 5 and 6, the deflector plate 30 includes an exterior ring 40 and an interior ring 42. A central hub 44 is positioned at a center of the deflector plate 30. When assembled, the central hub 44 extends through an opening 46 in the cap 28 (FIG. 3). A plate gear 48 is secured on the hub 44 and is rotatable with the deflector plate 30. As shown in FIGS. 7-9, the plate gear 48 includes a plurality of gear teeth 50 in various configurations depending on a desired wetted pattern (discussed in more detail below).

Figure 10:
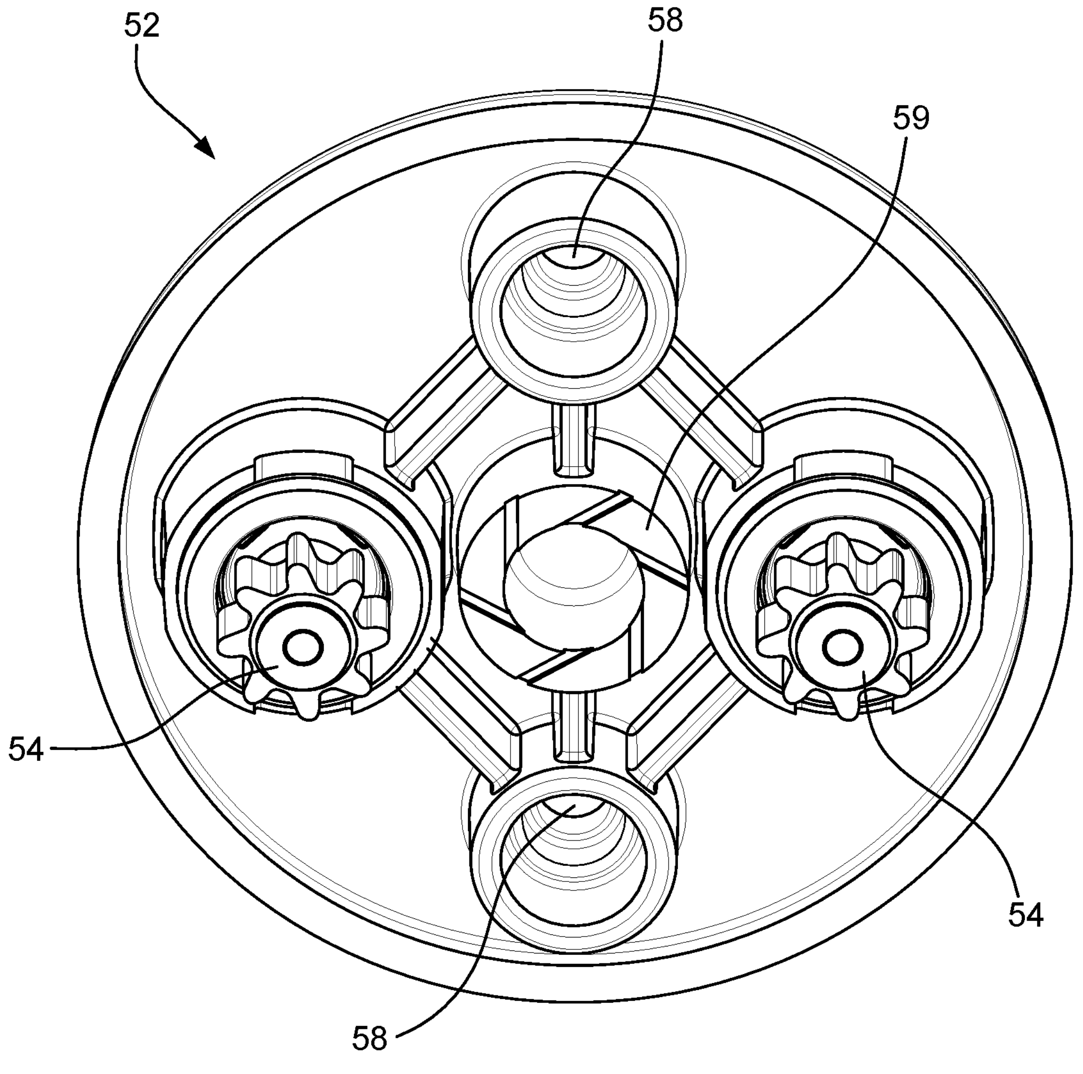
FIG. 10 is an interior view of the cover assembly.

FIG. 10 is an interior view of a cover assembly 52. The cover assembly 52 is connected to the cap 28 and includes one or more brake gears 54 coupled with a brake assembly 56 (FIG. 6). The cover assembly 52 includes openings 58 for receiving fasteners to secure the cover assembly 52 to the cap 28.

With continued reference to FIG. 6, the cap 28 includes a first labyrinth shield area 60 that mates with the exterior ring 40 on the upper outside diameter of the plate 30. The cap 28 also includes a second labyrinth shield area 62 just outboard of the upper plate radial bearing located at the lower end of the plate gear 48 that mates with interior ring 42. Any water or particulate that make it past the first labyrinth shield area 60 then has to make it past the second labyrinth shield area 62 in order to get to the upper plate radial bearing area. The interior ring 42 defines a grease cup, and as such, to reach the gear/compensating brake chamber, any contaminants must make their way past the first and second labyrinth shield areas 60, 62 and through the grease cup. Thus, the gear chamber is kept relatively free of contaminants without the use of large diameter seals that would add significant expense and undesirable seal drag.

In use, when the water is shut off, the deflector plate 30 will drop down in the cage 18 until the bearing ring 36 engages the upstanding ring 38 in the cage 18. This helps keep spiders and contaminants out of the area around the lower end of the deflector plate 30. As shown in FIG. 6, an interior of the cage 18 includes slits, which are narrow enough that large spiders (which could make nests that stall the sprinkler) are kept out of the area, and there are ample spider refuge areas on the underside of the cage 18 outside of this area.

The plate gear 48 includes a ring 51 at the top that serves as both an axial bearing and a compensating brake surface. Larger nozzles and higher pressures cause more load on the brake surface to help counteract the increased drive torque in order to keep rotation speed relatively constant over a wide range of nozzles and pressures.

Figure 11A:
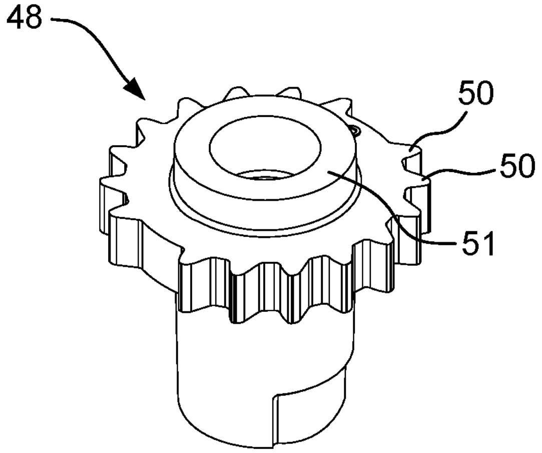
FIG. 11A shows an exemplary plate gear.
Figure 11B:
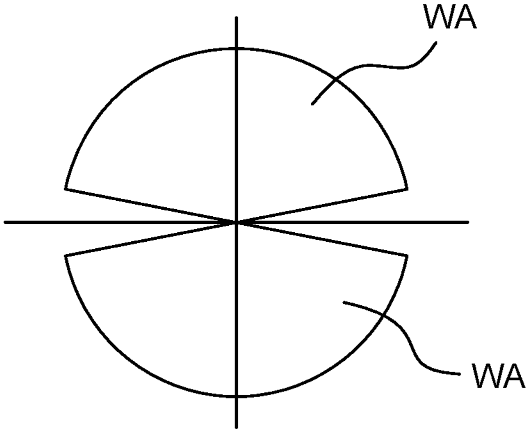
FIG. 11B shows the wetted pattern using the plate gear of FIG. 11A.

As water exits the nozzle 16, the water enters the lower end of the deflector plate 30. A force of the water in the offset deflector passage 32 causes the deflector plate 30 to rise off the upstanding ring 38 and to rotate. With reference to FIGS. 7 and 8, the plate gear 48 rotates with the deflector plate 30. The one or more brake gears 54 are disposed in a path of the gear teeth 50 of the plate gear 48. The plate gear 48 is rotating clockwise in FIGS. 7 and 8. In the sections of the plate gear 48 without teeth 50, the plate gear 48 and the deflector plate 30 rotate rapidly (e.g., accelerating to about 1000 RPM). When the teeth 50 engage the brake gear(s) 54 as shown in FIG. 8, the deflector plate 30 slows for irrigating the intended wetted area. With the configuration shown in FIGS. 7 and 8, the deflector plate 30 will move rapidly past the struts 22 and wet all remaining areas. The plate gear 48 in this configuration is shown in FIG. 11A, and the resulting wetted area (WA) is shown in FIG. 11B. Due to the speed of the deflector plate 30 in the areas without teeth 50, there is very little mist generated and there is very little water falling in the dry sectors.

Figure 12A:
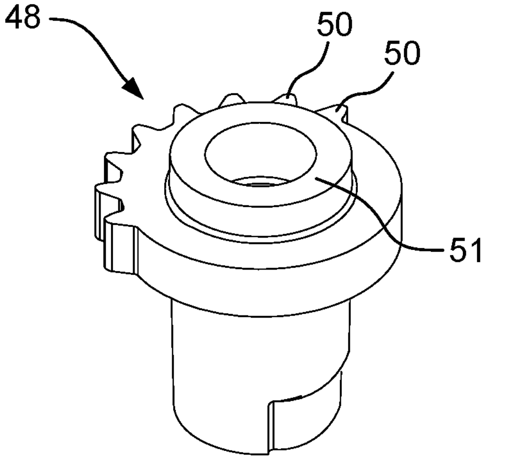
FIG. 12A shows an alternative plate gear.
Figure 12B:
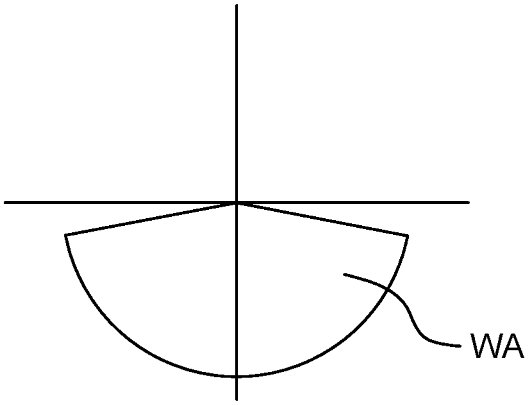
FIG. 12B shows the wetted pattern for the plate gear in FIG. 12A.

FIG. 9 shows an alternative configuration including gear teeth 50 on only one side of the plate gear 48. In the configuration shown in FIG. 9, the wetted area would essentially include the bottom half of the image. As the last tooth 50 of the plate gear 48 engages the brake gear 54, the deflector plate 30 would rotate rapidly back to the position shown in FIG. 9. FIG. 12A shows the plate gear 48 with gear teeth 50 on one side, and FIG. 12B shows the intended wetted area WA with this plate gear 48 configuration.

A center pivot equipped with the bow tie units (FIGS. 11A-11B) on top the span pipe with the struts 22 and the cap 28 (FIG. 2) aligned with the span pipe would create at any instant in time a wetted band in front of the pivot, a dry band under the pivot structure and tires, and a wetted band behind the pivot. This gives the soil a time to be wetted, followed by a time of absorbing without further wetting, followed by another time to be wetted, followed by another time of absorbing, as opposed to normal pivot watering where the soil is intensely watered and often generates significant runoff. Other features of the bow tie pattern include reduced drool off the pivot structure, and reduced misting due to reduced stream interference (pivot sprinklers are typically spaced closely toward the outer end of the machine, typically 7.5-10 feet apart).

The cover assembly 52 may be made out of a friction material so the raised ring 59 in the center will mate with the plate gear top ring 51 to complete the compensating brake. The brake assemblies 56 and brake gears 54 provide viscous braking, or other types of brakes could be used. In some embodiments, the cover assembly 52 includes two brake assemblies 56 and two brake gears 54, but some configurations may include one brake assembly 56 and one brake gear 54; or alternatively, the cover assembly 52 may include more than two brake assemblies 56 and two brake gears 54.

As shown in FIGS. 7-9, there is significant clearance between the teeth 50 of the plate gear 48 and the teeth of the brake gear(s) 54. The added clearance prevents small contaminants from stalling the rotation by getting jammed between the gears. In some embodiments, the gear teeth 50 are in the form of a standard involute profile on the side that meshes (since rotation is typically always in the same direction, there is no concern with backlash) but significant clearance and a buttress profile for strength on the non-meshing side. As shown, there are fewer teeth than standard, so the teeth are spread such that only one tooth on each gear is engaged at any one time. As such, as one tooth on the plate gear 48 disengages, the deflector plate 30 is free to accelerate as it rotates a few degrees until the next tooth 50 engages the brake gear 54. The acceleration sector is short enough in duration that the radius of throw just pulls back a few feet during this time. The net effect is that the wetted perimeter has 14 small non-clocking divots, which have minimal effect on uniformity of a traveling sprinkler, but this helps the sprinkler complete a full circle of operation in a shorter period of time, which is helpful because it is desirable that in the majority of the wetted pattern, the stream rotates slow enough to get maximum radius of throw (minimum horse-tailing), but if it takes too long to get around, the movement of the pivot can cause nonuniform streaks in the pattern. The maximum desired time for one complete rotation is around two minutes.

As would be appreciated by those of ordinary skill in the art, there are a myriad of potential gear and brake assembly arrangements, as well as the potential to mount the brake assemblies in the deflector plate rather than in the surrounding structure. Also, with some rearranging of shields, it would be possible to make a similar sprinkler that would hang on a rigid drop, and could have multiple balanced streams to also allow the use on a flexible (hose) drop.

Figure 13:
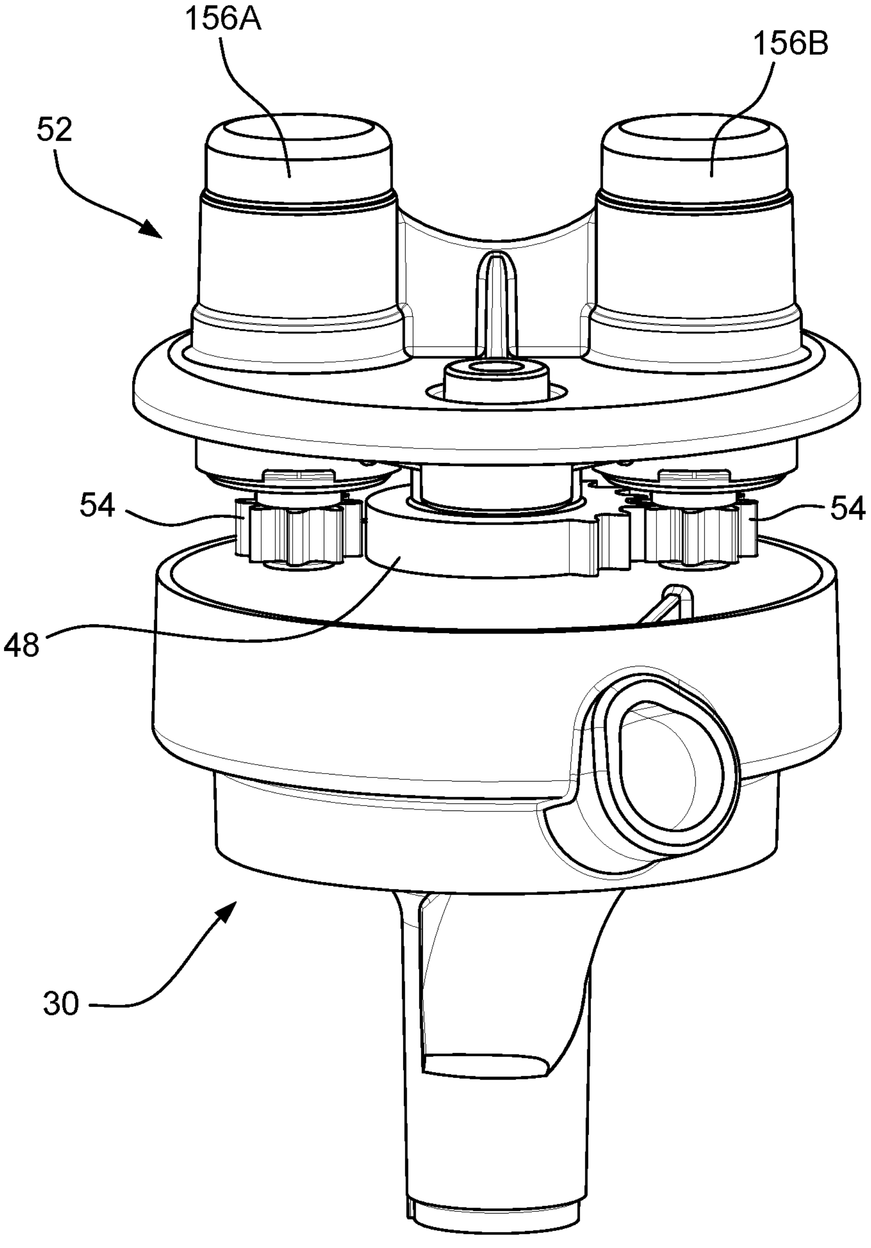
FIG. 13 is an exploded view showing the deflector plate, the plate gear, and the cover assembly.
Figure 14:
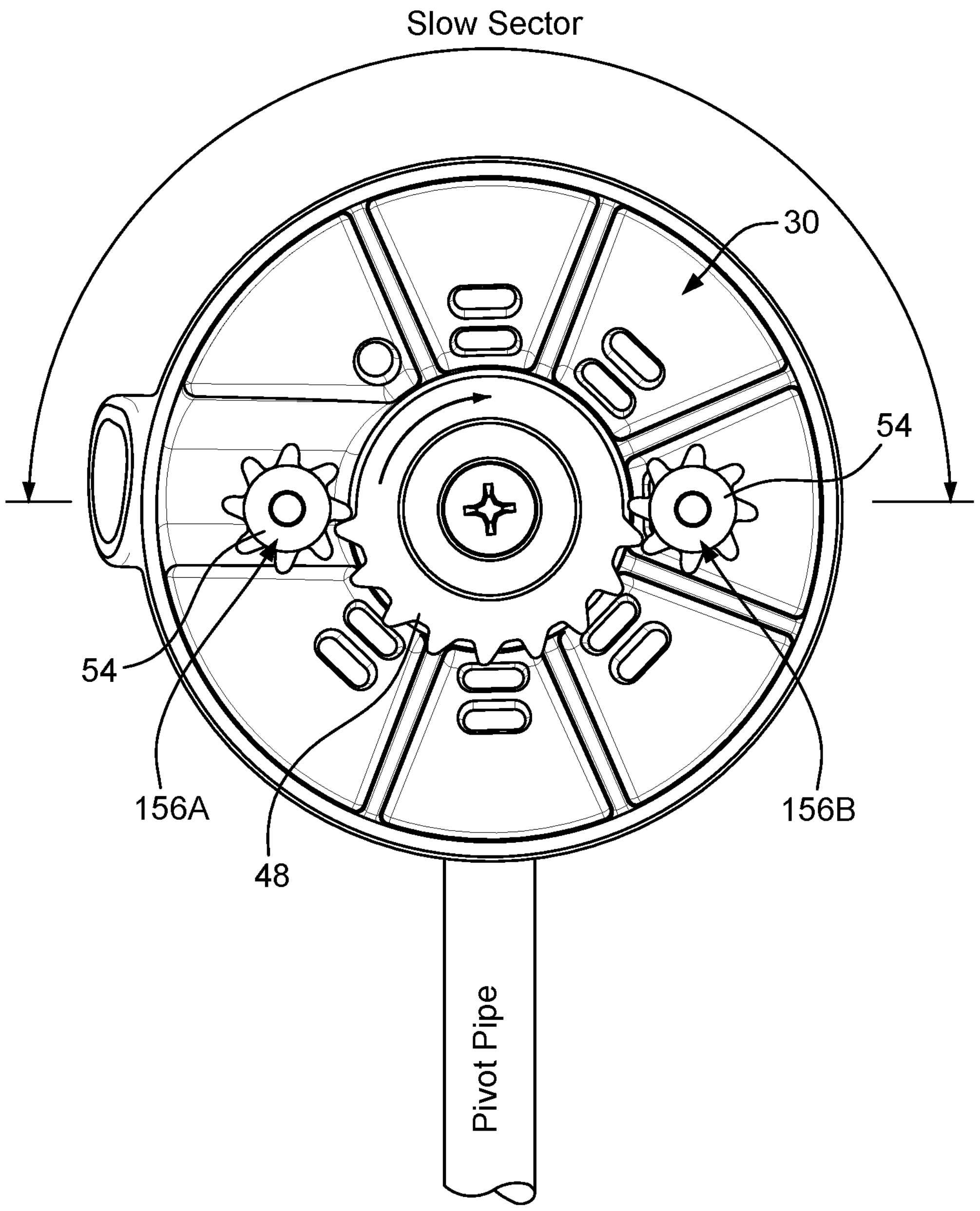
FIGS. 14 and 15 show an exemplary application using multiple brake assemblies with different braking characteristics.
Figure 15:
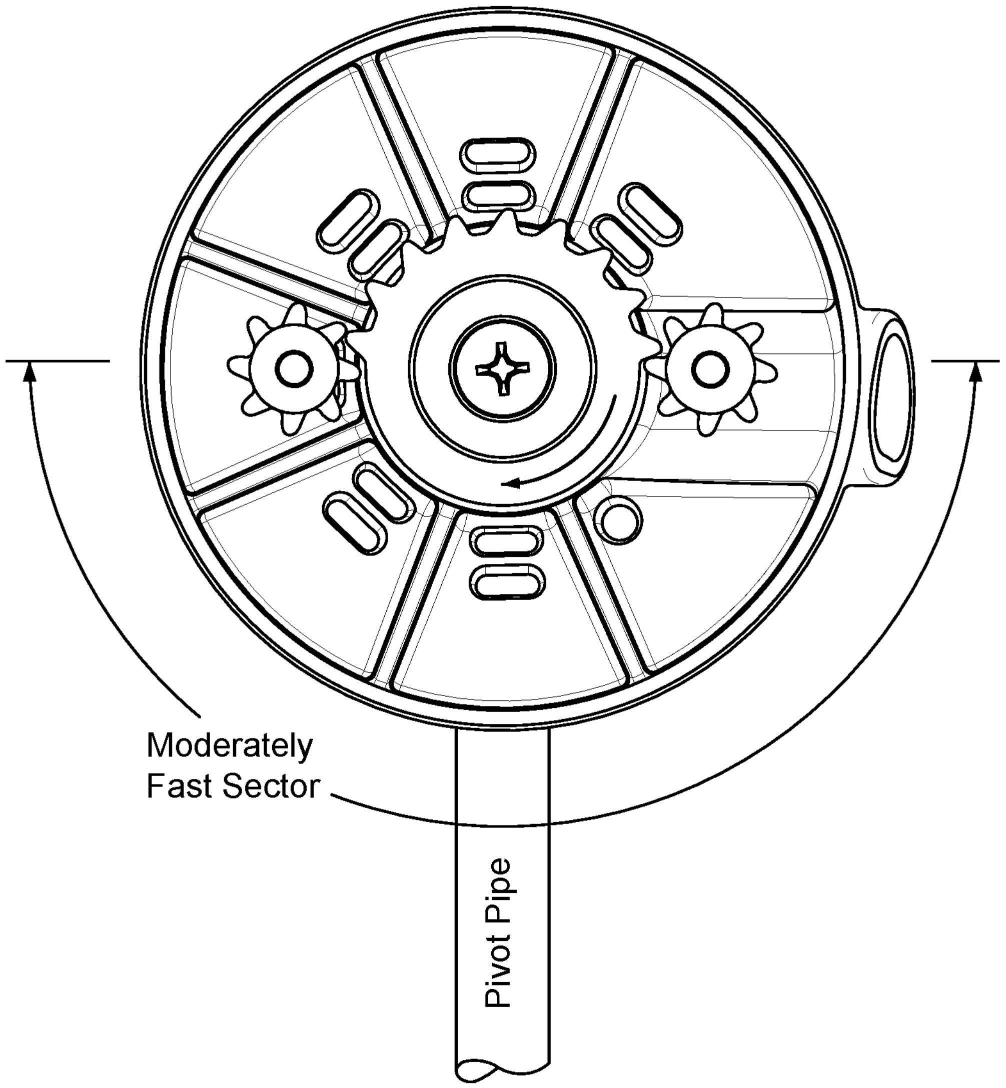

FIGS. 13-15 show an embodiment with the cover assembly 52 including multiple brake assemblies 156A, 156B, where the brake assemblies 156A, 156B include different braking characteristics. With different braking torques, the plate gear 48 can be configured to engage only one brake assembly at a time, thereby setting the stage for different precipitation rates and different radius of throw in different sectors.

In an exemplary configuration, with reference to FIGS. 14 and 15, the left-side brake assembly 156A may be provided with roughly 2.5 times the braking torque of the right-side brake assembly 156B. In FIG. 14, the deflector plate 30 is entering the slow sector where the plate gear 48 meshes with the brake gear of the left-side brake assembly 156A. With reference to FIG. 15, as the last tooth of the plate gear 48 disengages from the left-side brake assembly 156A, the leading tooth of the plate gear engages the right-side brake assembly 156B. In this configuration, the deflector plate 30 is entering the moderately fast sector.

This unit may be mounted on the end of a pivot span for use as an "end gun" and oriented such that the left-side brake assembly 156A is engaged when watering the half circle past the end of the pivot such that it would rotate relatively slow for maximum radius of throw and precipitation rate in that sector. Subsequently, the plate gear 48 would engage the right-side brake assembly 156B when watering the half-circle sector over the pivot. Due to the lower braking torque of the right-side brake assembly 156B, the deflector plate 30 would rotate at a moderately fast speed in that sector, with reduced radius of throw and precipitation rate to facilitate filling in needed water behind the end gun. In actual tests of a prototype, the unit took 50 seconds to cover the sector when engaged with the left-side brake assembly 156A and 20 seconds to cover the sector when engaged with the right-side brake assembly 156B.

Many other arrangements are possible, including a bow tie unit that has different speeds in the two watered sectors. In an exemplary application, to address rutting of the pivot tires in certain soil conditions, it may be better to apply less water in front of the pivot and more water behind the pivot so the tires are running on drier soil. In other soil conditions where runoff is the primary issue, it may be better to apply more water in front of the pivot where the soil is less saturated and therefore can absorb water faster.

The module and sprinkler assembly of the described embodiments is functional over a wide range of nozzle sizes and pressures and has a larger throw radius for specific applications. The combination of support bearings and water passage geometry for the deflector plate in combination with shielding geometry, gears and low-cost brake assemblies provides for a customizable up-top rotator-type pivot sprinkler with readily controllable wetted areas.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sprinkler module cooperable with a sprinkler nozzle unit supporting a sprinkler nozzle, the sprinkler module comprising:
- a cage attachable to the sprinkler nozzle unit and including a pair of struts;
- a cap connected to the cage via the pair of struts;
- a deflector plate cooperable with the sprinkler nozzle and rotatably secured between the cap and the cage, the deflector plate including a hub extending through the cap;
- a plate gear secured to the hub and rotatable with the deflector plate, the plate gear including gear teeth; and
- a cover assembly connected to the cap and including a brake gear coupled with a brake assembly, the brake gear being disposed in a path of the gear teeth,
- wherein the gear teeth are configured such that the deflector plate will rotate more rapidly at selected positions of the deflector plate than remaining positions of the deflector plate.

2. A sprinkler module according to claim 1, wherein the cage comprises snap fit tabs engageable with the sprinkler nozzle unit.

3. A sprinkler module according to claim 1, wherein the deflector plate comprises an upstanding ring, and wherein the cap comprises a first labyrinth shield that mates with the upstanding ring of the deflector plate.

4. A sprinkler module according to claim 3, wherein the deflector plate comprises a radial bearing disposed radially inward of the upstanding ring, and wherein the cap comprises a second labyrinth shield that mates with the radial bearing of the deflector plate.

5. A sprinkler module according to claim 4, wherein the radial bearing defines a grease cup.

6. A sprinkler module according to claim 1, wherein the gear teeth are positioned about only a portion of the plate gear.

7. A sprinkler module according to claim 1, wherein the cover assembly comprises two brake gears respectively coupled with two brake assemblies.

8. A sprinkler module according to claim 7, wherein the two brake assemblies comprise different braking characteristics.

9. A sprinkler module according to claim 1, wherein the gear teeth are configured such that the deflector plate will rotate more rapidly past the struts than between the struts.

10. A sprinkler module according to claim 9, wherein the gear teeth are configured in a bow tie pattern.

11. A sprinkler module according to claim 1, wherein the cover assembly comprises two brake gears respectively coupled with two brake assemblies, wherein the gear teeth are configured to effect a bow tie wetted pattern, and wherein the two brake assemblies comprise different braking characteristics such that opposite sides of the bow tie wetted pattern are watered at different speeds.

12. A sprinkler module according to claim 1, wherein a ring of the cover assembly mates with the plate gear.

13. A center pivot comprising the sprinkler module of claim 1 secured on a pivot pipe, wherein the struts and the cap are installed in alignment with the pivot pipe.

14. A sprinkler comprising:
- a sprinkler body securable to a source of fluid under pressure;
- a nozzle positioned in the sprinkler body;
- a cage attached to the sprinkler body and including a pair of struts;
- a cap connected to the cage via the pair of struts;
- a deflector plate cooperable with the nozzle and rotatably secured between the cap and the cage, the deflector plate including a hub extending through the cap;
- a plate gear secured to the hub and rotatable with the deflector plate, the plate gear including gear teeth; and
- a cover assembly connected to the cap and including a brake gear coupled with a brake assembly, the brake gear being disposed in a path of the gear teeth,
- wherein the gear teeth are positioned about only a portion of the plate gear such that a circumferential space between some of the gear teeth is greater than that between others of the gear teeth.

15. A sprinkler according to claim 14, wherein the cage comprises snap fit tabs engaging the sprinkler body.

16. A sprinkler according to claim 14, wherein the cover assembly comprises two brake gears respectively coupled with two brake assemblies.

17. A sprinkler according to claim 16, wherein the two brake assemblies comprise different braking characteristics.

18. A sprinkler according to claim 14, wherein the gear teeth are configured such that the deflector plate will rotate more rapidly past the struts than between the struts.

19. A sprinkler head comprising:
- a sprinkler body connected to a source of water, having a longitudinal center axis and provided with a nozzle that emits a stream along the longitudinal center axis;
- a water distribution plate supported downstream of the nozzle, the water distribution plate being configured to deflect the stream such that it drives concentric rotation of the water distribution plate about the longitudinal center axis and distributes the water radially outward in one or more streams;
- a plate gear coupled to and rotatable with the water distribution plate; and
- an arrangement of two or more gears and one or more brake assemblies associated with the sprinkler body and the plate gear of the water distribution plate to vary a speed of rotation of the water distribution plate in different sectors of its rotation, wherein the two or more gears are disposed radially outward of the plate gear.

* * * * *